United States Patent [19]

Hahmann et al.

[11] Patent Number: 4,738,104

[45] Date of Patent: Apr. 19, 1988

[54] HYDRAULIC POWER SYSTEM

[75] Inventors: Wolfgang Hahmann, Kempen; Claus Kirchherr, Remscheid, both of Fed. Rep. of Germany

[73] Assignee: Barmag AG, Remscheid, Fed. Rep. of Germany

[21] Appl. No.: 841,575

[22] Filed: Mar. 20, 1986

[30] Foreign Application Priority Data

Mar. 23, 1985 [DE] Fed. Rep. of Germany ....... 3510621

[51] Int. Cl.[4] .................................. F16D 31/02

[52] U.S. Cl. .................................. 60/431; 60/433; 60/484

[58] Field of Search .................................. 60/433, 431, 484

[56] References Cited

U.S. PATENT DOCUMENTS

| | | | |
|---|---|---|---|
| 3,589,130 | 6/1971 | Flaschar | 60/423 X |
| 4,355,655 | 10/1982 | Hertell et al. | 137/117 |
| 4,505,111 | 3/1985 | Okamoto et al. | 60/431 |
| 4,535,966 | 8/1985 | Post et al. | 251/31 |

*Primary Examiner*—William E. Wayner

*Attorney, Agent, or Firm*—Bell, Seltzer, Park & Gibson

[57] ABSTRACT

A hydraulic power system is disclosed which comprises an internal combustion engine having a speed regulator, and which serves to drive a hydraulic system including a pump and a consumer or load. A throttle valve is positioned in the hydraulic system, and the throttle valve is connected to an adjustable controller, such that the volume flow rate to the consumer is proportional to the control signal delivered to the throttle valve by the controller. The same control signal of the controller is also delivered to the speed regulator of the engine. In one disclosed embodiment, the hydraulic system includes a plurality of consumers connected to a common pump, and each consumer includes an associated throttle valve and controller. Also, means are provided for weighting the several control signals from the controllers, and summing the weighted signals so that a composite adjusting signal is delivered to the speed regulator of the engine.

1 Claim, 3 Drawing Sheets

HYDRAULIC POWER SYSTEM

The present invention relates to a hydraulic power system having provision for varying the speed of a driving prime mover in response to changes in the load on the system.

Mobile hydraulic power systems are commonly driven by an internal combustion engine having a variable speed control. In these systems, the variable speed is adjustable in a range between idling and maximum speed, so as to take into account the different loads on the system. Such adjustment is effected either by the operating personnel, such as by manually adjusting a throttle on the engine, or by an overriding control system which measures the load and operates the speed control in response thereto.

Control systems of the above type are subject to delays, which are acceptable in many cases where the load increases, but such delays are often unacceptable for safety reasons when the load rapidly decreases. Therefore, more commonly throttle valves are used in hydraulic systems for control of pressure and/or throughput. The use of such throttle valves is disadvantageous in that they result in power losses when the hydraulic consumer is operating under partial load.

It is accordingly an object of the present invention to provide a hydraulic power system which is adapted to control the speed of the driving prime mover in response to changes in load, and which avoids the power losses associated with the prior valve systems.

These and other objects and advantages of the present invention are achieved in the embodiments illustrated herein by the provision of a hydraulic power system which comprises a prime mover such as an internal combustion engine, and which includes regulator means for controlling the speed of the prime mover. A hydraulic system is provided which includes a hydraulic pump operatively connected to the output of the prime mover, a hydraulic consumer, and hydraulic line means operatively interconnecting the pump and the consumer. In addition, throttle valve means is positioned in the hydraulic line means for controlling the flow of a hydraulic fluid through the hydraulic line means so that the flow is proportional to an input control signal, and an adjustable controller is provided for transmitting a control signal to the throttle valve means. The controller is also operatively interconnected to the regulator means of the prime mover, such that the control signal also controls the speed of the prime mover.

Thus in accordance with the present invention, a throttle valve is employed, with the hydraulic output of the throttle valve depending only on the control signal from the controller, and not on the hydraulic parameters in the hydraulic line system. Such throttle valve may, in an advantageous embodiment, be connected to a flow meter, which measures the flow rate of the fluid controlled by the throttle valve, and the output of the flow meter is delivered to the control signal from the controller. By this arrangement, the control signal of the controller is modified by the signal from the flow meter, and the modified signal is delivered to the speed regulator of the engine and to the throttle valve so that the throughput is adjusted to maintain the desired throughput value.

In another advantageous embodiment, the throttle valve includes a so-called pressure difference balance, which maintains a constant pressure difference across the throttle valve, irrespective of the preset control signal.

The present invention may also be embodied in a system which includes several hydraulic consumers, with each consumer being controlled by an individual throttle valve and associated controller. In such case, the control signal of each controller is first weighted in a weighting converter, which transforms the control signals as a function of the consumption characteristic of each consumer, or its associated throttle valve. Parameters of this consumption characteristic include, in particular, the maximum flow, the maximum load pressure, and the adjusted pressure difference. The weighting converter is advantageously adapted for adjustment to the consumption characteristic of the individual consumers, or the throttle valves associated with the same, which may be done manually before start up.

The output signals of the weighting converter are supplied to a summing device, which sums the output signals and converts the signals to a composite adjusting signal. This adjusting signal is then supplied to the regulator of the prime mover, so as to adapt its speed to the weighted sum of the control signals supplied to the individual consumers.

Some of the objects and advantages of the present invention having been stated, others will appear as the description proceeds, when taken in conjunction with the accompanying drawings, in which FIG. 1 is a schematic circuit diagram illustrating an embodiment of the present invention which includes several hydraulic consumers;

Figure 1:
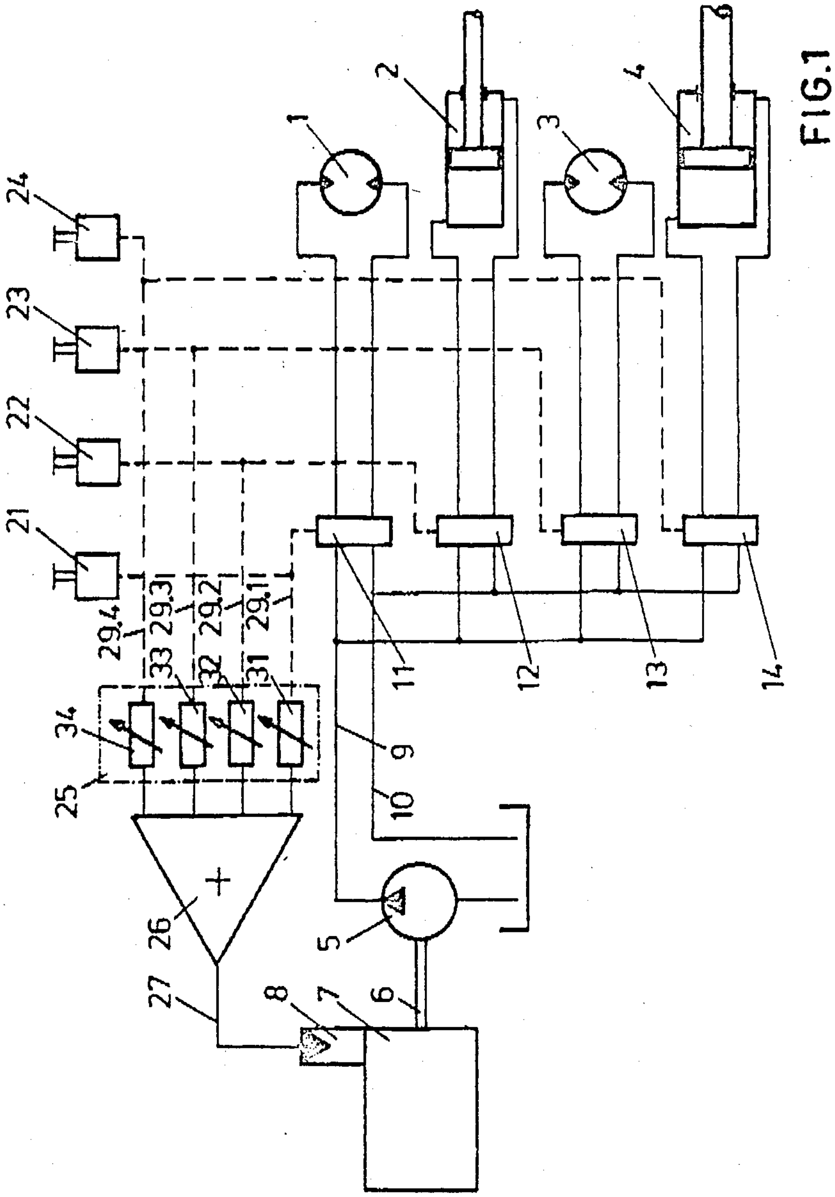

Referring more particularly to the drawings, FIG. 1 illustrates a hydraulic power system which includes a number of hydraulic consumers, specifically, hydraulic motors 1 and 3, and working cylinders 2 and 4. A hydraulic pump 5 supplies the hydraulic consumers 1–4 with hydraulic fluid (e.g. oil) from a tank, and the pump 5 is driven via a shaft 6 by a prime mover 7, which typically comprises an internal combustion engine. The speed of the internal combustion engine is adjustable by means of a conventional speed regulator 8.

Hydraulic line means in the form of a pump line 9 and a tank line 10 operatively interconnect the hydraulic pump 5 to each of the consumers 1–4. The branches of the pump line 9 mount throttle valves 11, 12, 13, and 14 which are associated with respective ones of the consumers 1–4. The specific construction of the valves 11–14 will be described in more detail below in conjunction with FIGS. 3 and 4.

The throttle valves 11–14 and the consumers 1–4, are controlled by a control signal from the adjustable controllers 21, 22, 23, and 24, respectively, which may be either pressure control means or electrical control means. The essential property of the valves 11–14 and their associated controllers 21–24 is that the hydraulic throughput of the throttle valves, i.e., their volume flow to the consumer, is proportional to the control signal of the controllers 21–24.

The circuit to the extent described above is known in the prior art. However, the prior art circuits of this type include a pressure relief valve or a bypass valve in the pump line 9, which insures that the oil delivered by the pump can flow into the tank when all of the consumers are idle. In this case, however, such pressure relief valves and bypass valves are subject to power losses, and such power losses are essentially avoided by the present invention.

In the present invention, the control signals of the controllers 21–24 are not only used for the adjustment of the throttle valves 11–14, but they are also supplied to a weighting converter 25. This weighting converter consists of individual converters 31, 32, 33, and 34, which can be adapted to the consumption characteristics of the consumers 1, 2, 3, 4, or of the throttle valves 11, 12, 13, 14 associated thereto. This may be accomplished, for example, by a manual adjustment. The adjustment is effected so that the output signals of the converters 31–34 are proportional to each other at the same ratio as for example the maximum flow rates of the valves 11–14 or the consumers 1–4 are proportional to each other. The output signals of the individual converters 31–34 are then supplied in this weighted form to a summing device 26, and the summed total is delivered as a composite adjusting signal 27. The adjusting signal 27 forms the input signal for the regulator 8 of the internal combustion engine 7. The regulator 8 is designed so that it adjusts the speed of the engine, for example by the adjustment of the carburetor throttle valve, or of the fuel injection pump, and such that the speed between the idling speed and the maximum speed is proportional to the signal 27 of the summing device.

Figure 2A:
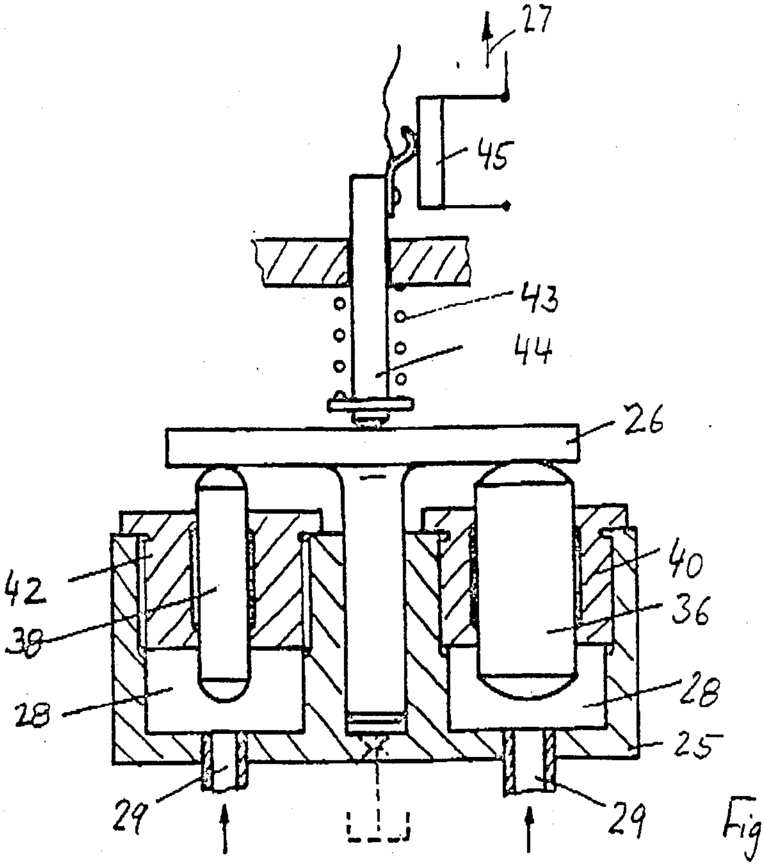
FIG. 2A is a schematic side elevation view of an embodiment of a summing converter adapted for use with the embodiment of FIG. 1.
Figure 2B:
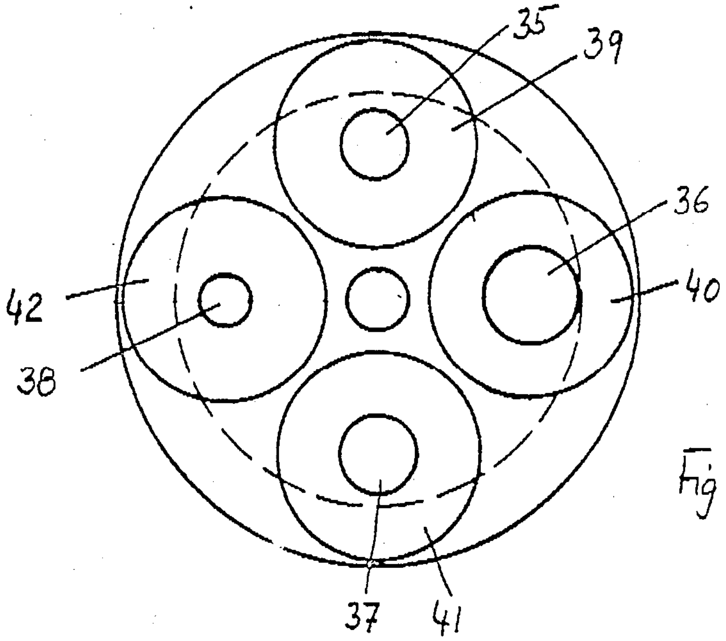
FIG. 2B is a plan view of the summing converter shown in FIG. 2A.

FIGS. 2A and 2B illustrate an embodiment of a weighting converter and summing device. FIG. 2A is a sectional view of the device, and FIG. 2B is a top plan view thereof. The weighting converter comprises four pistons 35, 36, 37, 38, which are slideably mounted in cylindrical sleeves 39, 40, 41, and 42, respectively. A separate cylindrical cavity 28 is defined beneath each of the pistons, and each cavity 28 receives via a line 29 a control signal 29.1–29.4 from the controllers 21–24. If the controllers 21–24 are pressure transmitters, the pressure can be supplied directly to the cavities 28 via the lines 29. However, if the controllers supply an electrical output signal, the electrical signal must first be converted to a pressure signal. In each case, the pressure supplied via the line 29 to the cylindrical cavities 28 is proportional to the control signal of the controllers 21–24.

The inside diameters of the cylindrical sleeves 39–42 differ, and the outside diameters of the pistons 35–38 similarly differ. The selection of the sleeves and pistons permits an adaptation for the consumption characteristics of the associated throttle valves 11–14 or consumers 1–4. The predetermination of the diameters permits pistons 35–38 to exert a force on the plate 26 which is weighted in accordance with the consumption characteristics. This plate 26 serves as a summing device, and is slideably mounted for movement in an axial direction. Also, the plate 26 is biased by the pistons 35–38 against a push rod 44 and spring 43, which serves to displace the push rod 44 against the force of the spring. The push rod 44 is part of a potentiometer 45, and the output signal 27 of the potentiometer is supplied to the regulator 8 of the engine 7. The displacement of the push rod 44, and thus also the output signal 27 of the potentiometer 45, are proportional to the sum of the forces which are exerted by the pistons 35–38.

Figure 3:
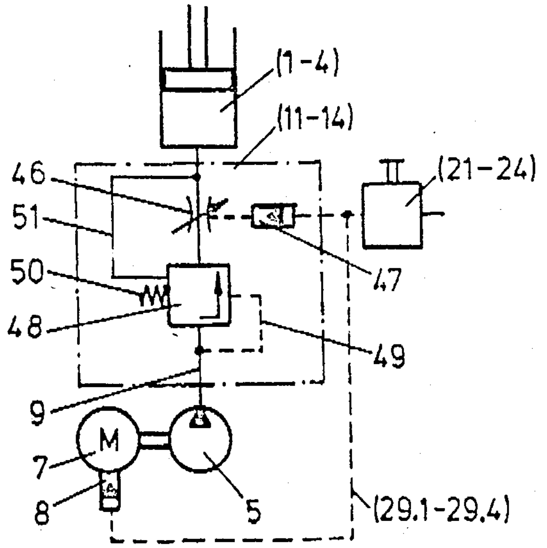
FIG. 3 is a schematic circuit diagram of another hydraulic power system which embodies the present invention.
Figure 4:
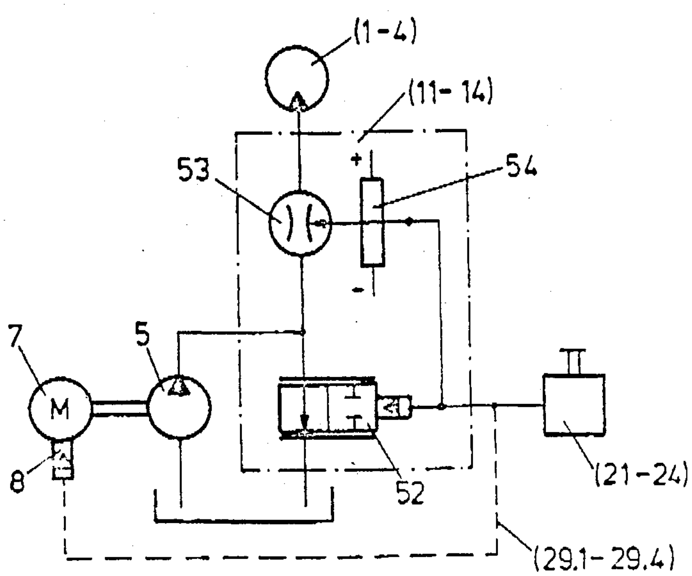
FIG. 4 is a schematic circuit diagram of still another hydraulic power system which embodies the present invention.

FIGS. 3 and 4 illustrate two additional embodiments of hydraulic power systems in accordance with the present invention, with the throttle valves being shown in the dashed line boxes. Each of the throttle valves represents one of the throttle valves 11–14 of the embodiment of FIG. 1, and the other parts of the hydraulic system are indicated by numerals which correspond to the embodiment of FIG. 1.

The throttle valve of FIG. 3 comprises a throttle 46, which is adjustable, for example, by a hydraulic precontrol 47. The hydraulic precontrol is in turn controlled by the signal from one of the controllers 21–24. At the same time, the control signal from the controller is supplied via one of the lines 29.1–29.4 to the regulator 8 of an internal combustion engine 7. A conventional pressure difference balance 48 is disposed in the pump line 9, and one side of the piston of this pressure difference balance receives the pump pressure via a line 49. The other side of the piston of the pressure difference balance is biased by a spring 50 and further, by the pressure on the opposite side of the throttle valve 46, i.e., by the consumer pressure, via line 51. A pressure difference balance of this type is known in the art, note for example U.S. Pat. No. 4,355,655, and serves to insure that the pressure drop across the throttle 46 is constant. This in turn assures that the flow of the adjustable throttle valve is dependent only on the signal from the controller 21–24, and the opening width of the throttle valve which influenced thereby. As a result, a load independent control of the consumers 1–4 can be effected.

In the embodiment of FIG. 4, the throttle valve 11–14 again comprises several components which are positioned within the dashed line box. In this embodiment, the throttle valve comprises a bypass valve 52 and a flow meter 53. An output signal for the flow meter 53 is generated by a potentiometer 54, which follows the position of the measuring piston of the flow meter 53. The output signal of the potentiometer 54 modifies the control signal from the controller 21–24, and the modified signal is supplied to the bypass valve 52, in such a way that the flow rate which is preset by the control signal from the controller 21–24 remains constant. Also, the modified signal is fed to the speed regulator 8 of its engine 7. As a result, the pump 5 is driven at a speed which is adapted to the momentary requirements of the consumer 1–4, and as preset by the controllers 21–24.

In the drawings and specification, there has been set forth a preferred embodiment of the invention, and although specific terms are employed, they are used in a generic and descriptive sense only and not for purposes of limitation.

That which is claimed is:

1. A hydraulic power system comprising a prime mover, including regulator means for controlling the speed thereof, a hydraulic system, including a pump operatively connected to the output of said prime mover, a plurality of hydraulic consumers, and a plurality of hydraulic line means operatively interconnecting said pump to respective ones of said consumers, a plurality of throttle valve means positioned in respective ones of said hydraulic line means for controlling the flow of a hydraulic fluid through each hydraulic line means to the associated consumer and so that the flow to each consumer is proportional to an input control signal delivered to the associated throttle valve means, a plurality of adjustable controller means for transmitting a control signal to respective ones of said throttle valve means, and means operatively interconnecting each of said controller means to said regulator means such that said control signals also control the speed of said prime mover, and including means for adjustably weighting the value of each of said control signals, and for summing the weighted values to produce a composite adjusting signal, and such that the composite adjusting signal is delivered to said regulator means.

* * * * *